United States Patent [19]
Sugiura

[11] Patent Number: 5,027,336
[45] Date of Patent: Jun. 25, 1991

[54] OPTICAL INFORMATION READING APPARATUS WITH TRACKING ADJUSTMENT SYSTEM

[75] Inventor: Satoshi Sugiura, Saitama, Japan

[73] Assignee: Pioneer Electronic Corporation, Tokyo, Japan

[21] Appl. No.: 251,477

[22] Filed: Sep. 30, 1988

[30] Foreign Application Priority Data

Oct. 29, 1987 [JP] Japan .................. 62-274070

[51] Int. Cl.$^5$ .............................................. G11B 7/00
[52] U.S. Cl. ................. 369/44.13; 369/44.32
[58] Field of Search ............... 369/44.13, 44.32, 44.33; 250/202

[56] References Cited

U.S. PATENT DOCUMENTS

| | | | |
|---|---|---|---|
| 4,397,010 | 8/1983 | Nabeshima | 369/44.13 |
| 4,466,087 | 8/1984 | Cheng . | |
| 4,482,989 | 11/1984 | Bierhoff | 369/44.13 |
| 4,488,276 | 12/1984 | Tanaka et al. | 369/44.13 |
| 4,748,609 | 5/1988 | Yonezawa et al. | 369/44.13 |

FOREIGN PATENT DOCUMENTS

0016433 10/1980 European Pat. Off. .
0044194 1/1982 European Pat. Off. .
0068548 1/1983 European Pat. Off. .

OTHER PUBLICATIONS

Patent Abstracts of Japan, vol. 6, No. 156 (P-135) (1034), Aug. 17, 1982.
European Search Report, EP 88 11 5610, May 11, 1989, by Examiner F. M. Cleary.

*Primary Examiner*—Donald McElheny, Jr.
*Attorney, Agent, or Firm*—Sughrue, Mion, Zinn, Macpeak & Seas

[57] ABSTRACT

Reduction of a number of parts required for servo control in an optical disk reproducing apparatus is achieved by deriving information relating to errors caused by warp or tilt of an optical disk from other error signals produced by other servo devices within the apparatus. A beam spot used to irradiate a disk surface is oscillated, and a frequency and amplitude component arising from this oscillation is extracted from the output of a light detector. The information provided by the frequency and amplitude may be used to compensate for tilt and warp, even though the detected signals are used for tracking and focusing servo devices in the optical disk apparatus. The technique is applicable to various types of discrete producing approaches, including a push-pull, a heterodyne system, and a three-beam system.

12 Claims, 4 Drawing Sheets

OPTICAL INFORMATION READING APPARATUS WITH TRACKING ADJUSTMENT SYSTEM

BACKGROUND OF THE INVENTION

The present invention relates to an optical information reading apparatus for reading recorded information from a disk-like recording medium such as a video disk, a digital audio disk, or the like (hereinafter simply referred to as a "disk").

In such an apparatus, a focusing servo for bringing a light beam radiated from an .optical pickup into accurate focus, and a tracking servo for making a beam spot accurately trace a recording track are indispensable for reading recorded information accurately from a disk. In these types of apparatus, if a disk is warped, the information recording surface of the disk becomes tilted relative to an optical axis of an information detecting light beam, and a tracking error signal is generated, since the shape of the beam spot is warped by factors such as a comatic aberration, even when the beam spot is correctly on a recording track. Under these circumstances, the tracking servo can shift the beam spot out of the recording track, and will provide an indication of zero tracking error, despite this mispositioning. The beam spot therefore is not radiated correctly on the recording track in spite of the tracking error being "officially" zero, so that operation may be influenced by pit information from an adjacent track, resulting in crosstalk.

In order to prevent such deterioration in performance, a tilting servo action may be performed, in which tilt of an optical axis of an information detecting light beam relative to an information recording surface of a disk is detected and pickup tilt is adjusted so that the optical axis of the light beam is kept always perpendicular to the information recording surface.

FIG. 5 shows a conventional tilting servo device in which an optical pickup 3 for reading recorded information of a disk 2 which is driven and rotated by a spindle motor 1 includes an objective lens 4. The objective lens 4 is mounted on an optical body 5 for movement in the direction of an optical axis A—A', the objective lens 4 being driven by a focus actuator (not shown). The optical body 5 is attached to a slider base 6 for rotation about a pivot 0 positioned on the optical axis A—A' of the objective lens 4. An adjustment mechanism 7 constituted by a tilt motor M (shown in FIG. 6), a speed reduction mechanism, etc., rotates the optical body 5 relative to the slider base 6 to adjust tilt of the optical axis A—A' of the objective lens 4 relative to an information recording surface. The slider base 6 is movable in a radial direction B—B' of the disk 2 along a guide rail (not shown), and is driven by a driving mechanism (not shown), for example, a slider motor, a reduction gear, etc.

In a plane including the optical axis A—A' of the objective lens 4 and perpendicular to the moving direction of the slider base 6, a tilt sensor 8 for detecting a tilt angle of the disk 2 relative to the optical axis A—A' is provided in the vicinity of the objective lens 4. As shown in FIG. 6, the tilt sensor 8 is constituted by a luminous element 9 and two light receiving elements 10a and 10b, so that the light receiving elements 10a and 10b can receive a light beam which is emitted from the luminous element 9 and then is reflected from the information recording surface of the disk 2. A difference between respective intensities of light received by the light receiving elements 10a and 10b is obtained by a differential amplifier 11, and is supplied, as information related to tilt of the disk 2 relative to the optical axis A—A', to a tilt motor 13 in the adjustment mechanism 7 (shown in FIG. 5) through a driving amplifier 12.

In the FIG. 5 arrangement, when the slider base 6 moves from a position (a) to a position (b) corresponding to a warped portion on the outer circumference of the disk 2, a tilting servo action is performed such that the adjustment mechanism 7 is driven in response to a driving signal in accordance with an output of the tilt sensor 8 so that the optical body 5 is rotated clockwise in FIG. 5 about the pivot 0 to make the optical axis A—A' perpendicular to the information recording surface of the disk 2.

In such a conventional apparatus, tilt of the optical axis of the information detecting light beam relative to the information recording surface of the disk 2 is detected by the tilt sensor 8 provided in the vicinity of the objective lens 4, and the tilt is corrected so that the beam spot is positioned accurately on the recording track. A detection error therefore is large because of a difference between the irradiation positions of the information detecting light beam and the light beam for the tilting servo.

If there is an attachment error or the like in the tilt sensor 8, it is impossible to detect tilt of the optical axis of the information detecting light beam with respect to the recording surface, even if it is possible to detect tilt of the optical axis of the light beam for the tilting servo relative to the information recording surface of the disk 2. Consequently, it has been impossible to correct accurately a displacement of the beam spot relative to the recording track caused by the tilt of the optical axis of the information detecting light beam. Further, because of a requirement of providing an optical system (the tilt sensor 8) for detecting tilt independently of an optical system for detecting information, not only is there an increase in the number of parts, but it is also necessary to provide sufficient space for the additional parts, so that the apparatus is large in size and is expensive.

SUMMARY OF THE INVENTION

In view of the foregoing problems, it is an object of the present invention to provide an optical information reading apparatus in which a tilt sensor is omitted, yielding a decrease in size as well as in cost of the apparatus, and in which an information detecting light beam itself is utilized to detect accurately a displacement of a beam spot relative to a recording track so that it is possible to correct the displacement accurately.

The optical information reading apparatus according to a first aspect of the present invention is arranged such that a driving signal of a predetermined frequency is superimposed on a tracking error signal to make a beam spot oscillate while it traces a recording track. A frequency component due to the oscillation of the beam spot is extracted from the output of a light detector receiving the beam spot's reflection from an information recording surface of a disk. The amplitude of the frequency component and its phase relative to a reference signal are detected to produce a detection signal, and the relative position of the beam spot relative to the recording track is adjusted in accordance with the detection signal.

According to a second aspect of the present invention, the just-mentioned detection signal may be used to adjust tilt of an optical axis of the light beam relative to the information recording surface.

According to a third aspect of the present invention, either the relative position of the beam spot relative to the recording track or tilt of an optical axis of the light beam relative to the information recording surface is adjusted in accordance with the detection signal.

BRIEF DESCRIPTION OF THE DRAWINGS

The foregoing and other objects and aspects of the present invention will be described in detail with reference to the accompanying drawings, in which.

DETAILED DESCRIPTION OF THE PREFERRED EMBODIMENTS

Figure 1:
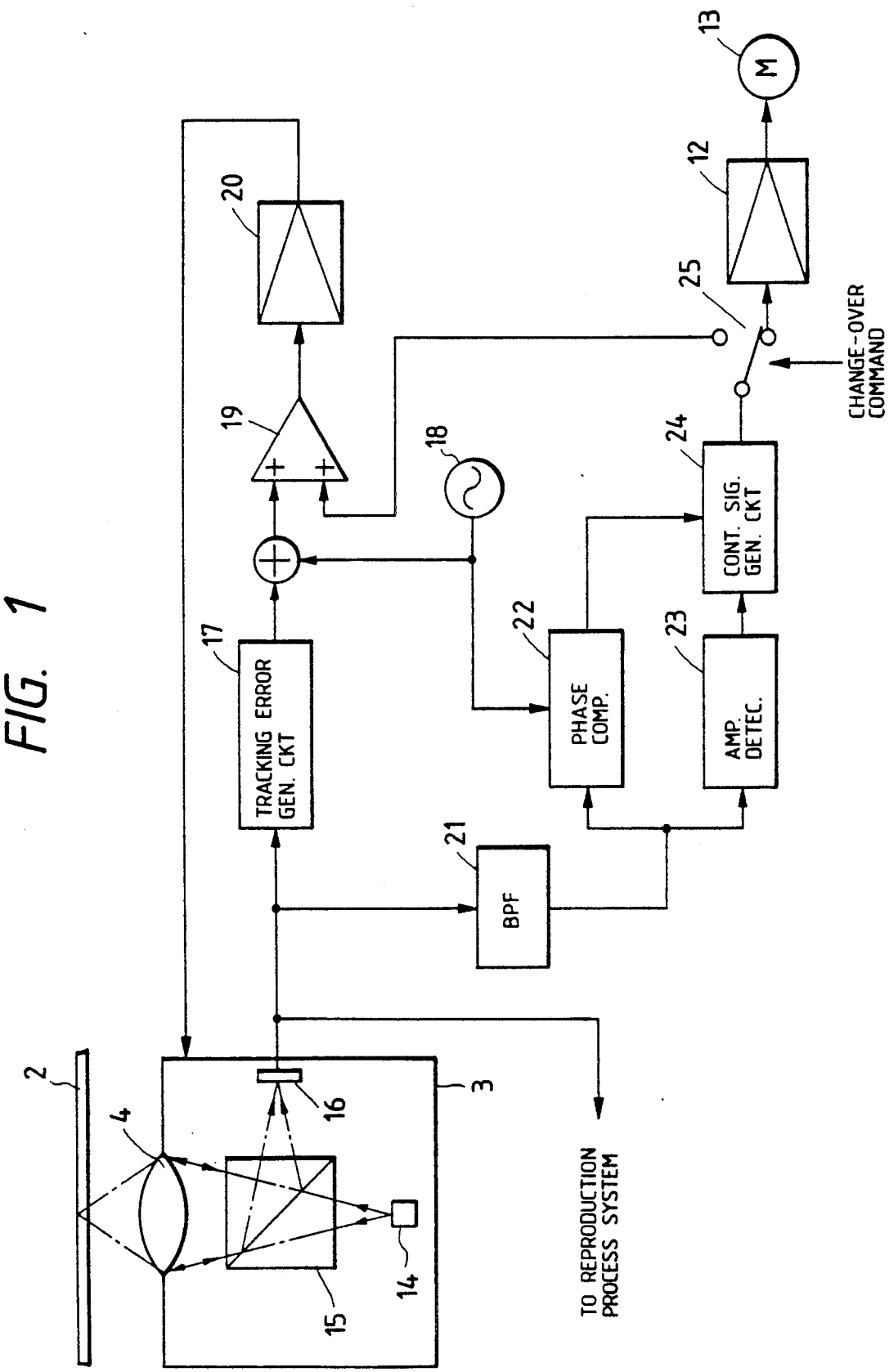
FIG. 1 is a block diagram of an embodiment of the present invention.
Figure 5:
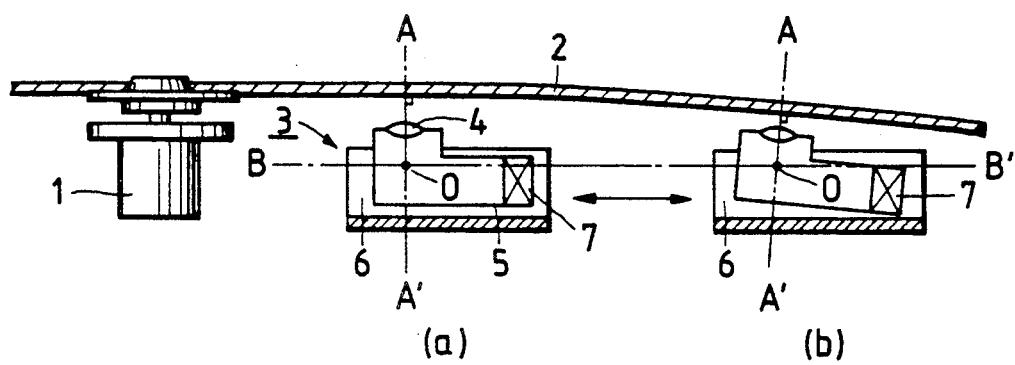
FIGS. 5 and 6 are block diagrams illustrating a conventional example of a tilting servo device.
Figure 6:
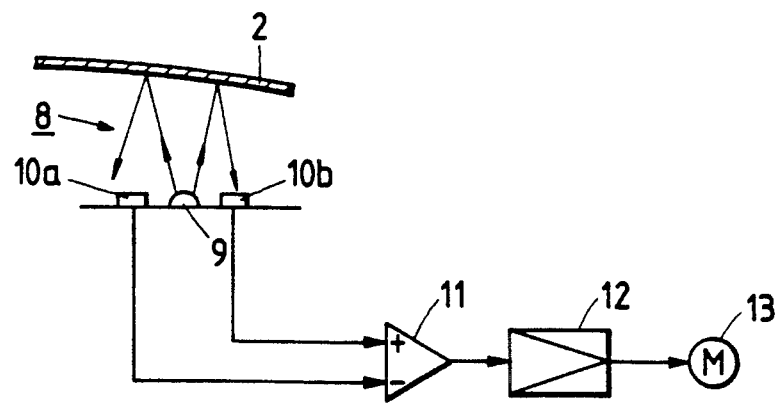

FIG. 1 is an schematic diagram illustrating an embodiment of the present invention in which the same or equivalent parts as in FIG. 5 are referenced correspondingly. In FIG. 1, an optical pickup 3 may comprise a light source 14 such as a semiconductor laser, a beam splitter 15 for separating incident light and reflected light, an objective lens 4 for focusing a light beam radiated from the light source 14 on an information recording surface, and a light detector 16, such as a photodiode, for receiving the light beam reflected on the information recording surface and passing it through the objective lens 4 and the beam splitter 15. An output of the light detector 16 is supplied as an RF output to a reproduction processing system to perform signal processing such as demodulation and so on, a part of the output being supplied to a tracking error generating circuit 17 to perform detection of a tracking error. A push-pull system, a heterodyne system, and a three-beam system, among others, have been used as a detection system for detecting a tracking error. When a plurality of light beams are used, such as in the three-beam system or the like, a light separating device such as a diffraction grating is provided between the light source 14 and the beam splitter 15 in the pickup 3.

A driving signal of a predetermined frequency and amplitude (e.g., 1 kHz frequency, and an amplitude one-half that of the track pitch of the disk 2) output by an oscillator 18 is superimposed on a tracking error signal generated by the tracking error generating circuit 17, to form an input to an adder 19. An output of the adder 19 passes through a driving amplifier 20 as a driving input to a tracking actuator (not shown) of the pickup 3. Since the tracking error signal on which the driving signal is superimposed thus is made to be the driving input to the tracking actuator, a beam spot focused on the information recording surface of the disk 2 traces a recording track while oscillating at the above-mentioned frequency. The output of the light detector 16 also is supplied to a band pass filter (BPF) 21, and a signal component of the above-mentioned frequency is extracted in the BPF 21. The extracted signal component is supplied to a phase comparator 22 and a amplitude detector 23. The phase relation between the signal component extracted by the BPF 21 and the driving signal from the oscillator 18 is detected in the phase comparator 22, and the amplitude of the signal component is detected in the amplitude detector 23.

Figure 2:
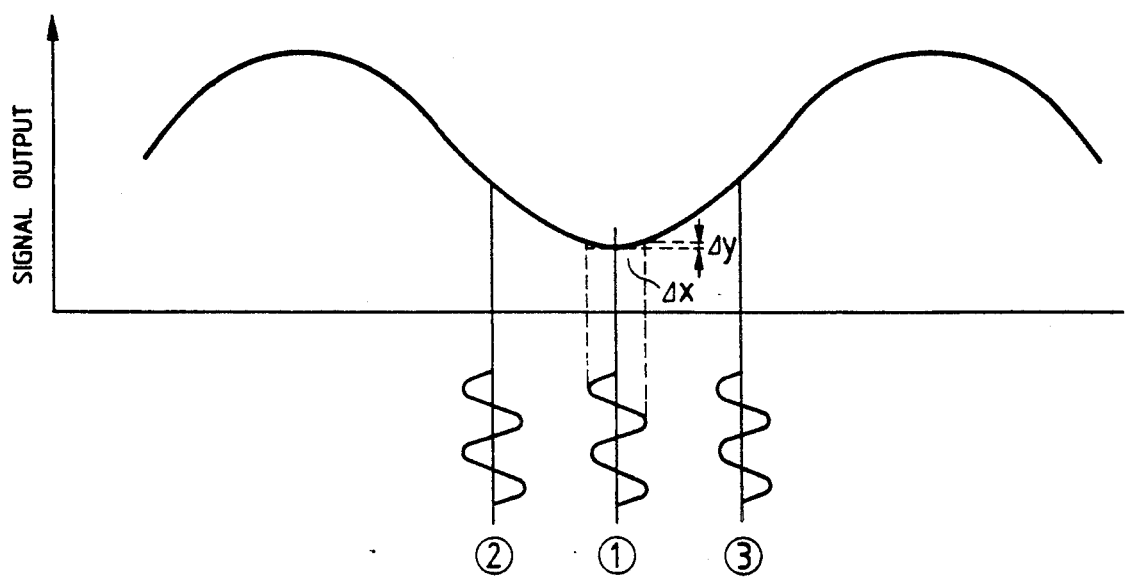
FIG. 2 is a waveform diagram illustrating the relation between the position of a beam spot relative to a recording track and an output signal of a light detector.
Figure 3:
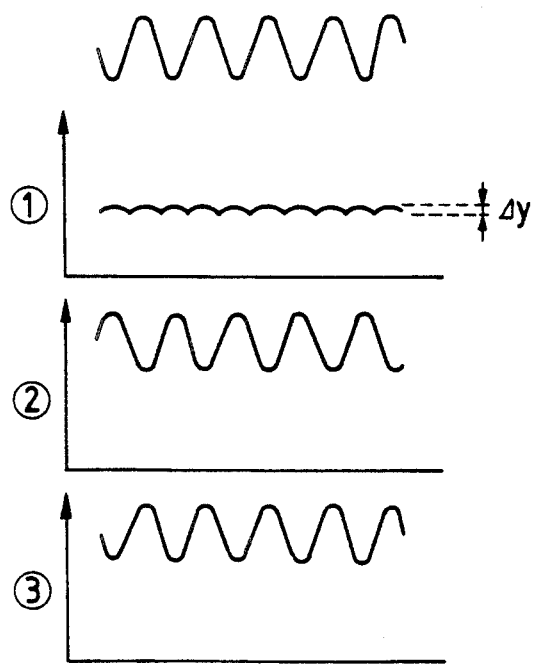
FIG. 3 is a waveform diagram illustrating an output signal of a BPF 21 for three different instances of oscillating the beam spot at respective positions (1), (2) and (3) in FIG. 2.

FIG. 2 shows the relation between a position of the beam spot relative to the recording track and an output signal of the light detector 16 (an envelope of the reading RF signal). The output is at a minimum when the beam spot is at a center position (1) of the recording track, and the output increases in accordance with each of the deviations (2) and (3) from the center of the track. FIG. 3 shows an output signal of the BPF 21 for the situations in which the beam spot is oscillated with an amplitude Δx at the respective positions (1), (2) and (3) as described above. Assuming that an output frequency of the oscillator 18 is f, there are respectively obtained an output signal having a frequency 2f and an amplitude Δy at the position (1), an output signal having the frequency f and inverted phase at the position (2), and an output signal having the same frequency f and the equal phase at the position (3). At the respective positions (2) and (3), the amplitude Δy of the output signal is proportional to the amount of deviation of the beam-spot from the recording track. If the beam spot is positioned on the center of the recording track by the operation of the tracking servo, an output waveform as shown in FIG. 3 (1) is always obtained.

However, if an optical axis of the light beam for detecting information is tilted relative to the information recording surface of the disk 2, the beam spot deviates from the center of the recording track by an amount corresponding to the degree of tilt, so that its direction of deviation (direction (2) or (3)) depends on the tilt direction. That is, since a part of the light reflected from the information recording surface cannot return to the objective lens 4 if the optical axis is tilted relative to the information recording surface, the amounts of light returning to respective receiving light sections of the light detector are different when a tracking error producing system such as the push-pull system using a two-division light detector, the heterodyne system using a four-division light detector, or the like is used, so that a tracking error is produced even though the beam spot is centered on the recording track. In a tracking error system such as in the three-beam system, since the shapes of beam spots on the recording track are different because of comatic aberration, the respective amounts of light returning to a pair of light detectors for the tracking servo are different from each other so that a tracking error is produced in spite of the beam spots being on the track. That reason is that the tracking servo operates to make the tracking error zero and therefore to move the beam spots in the direction in which the beam spots are shifted out of the track, in spite of the beam spots being on the track.

Thus, if the optical axis of the information detecting light beam is tilted relative to the information recording surface of the disk 2, the real beam spot deviates from the center of the recording track, although the tracking error is zero. When the beam spot is oscillated in this state, an output signal having a waveform shown in FIG. 3 (2) and (3) is obtained as the output of the BPF 21. It is possible to know the direction and quantity of tilt of the optical axis (corresponding to the direction and quantity of deviation of the beam spot), respectively, based on the phase relation of this output signal to the driving signal from the oscillator 18 and the amplitude of this output signal, so that it is possible to perform position adjustment of the beam spot or tilt adjustment of the optical axis based on this information. Therefore, a control signal generating circuit 24, based on the respective outputs of the phase comparator 22 and the amplitude detector 23, produce a control signal whose polarity and level respectively correspond to the direction and amount of tilt of the optical axis (the direction and quantity of deviation of the beam spot).

Figure 7:
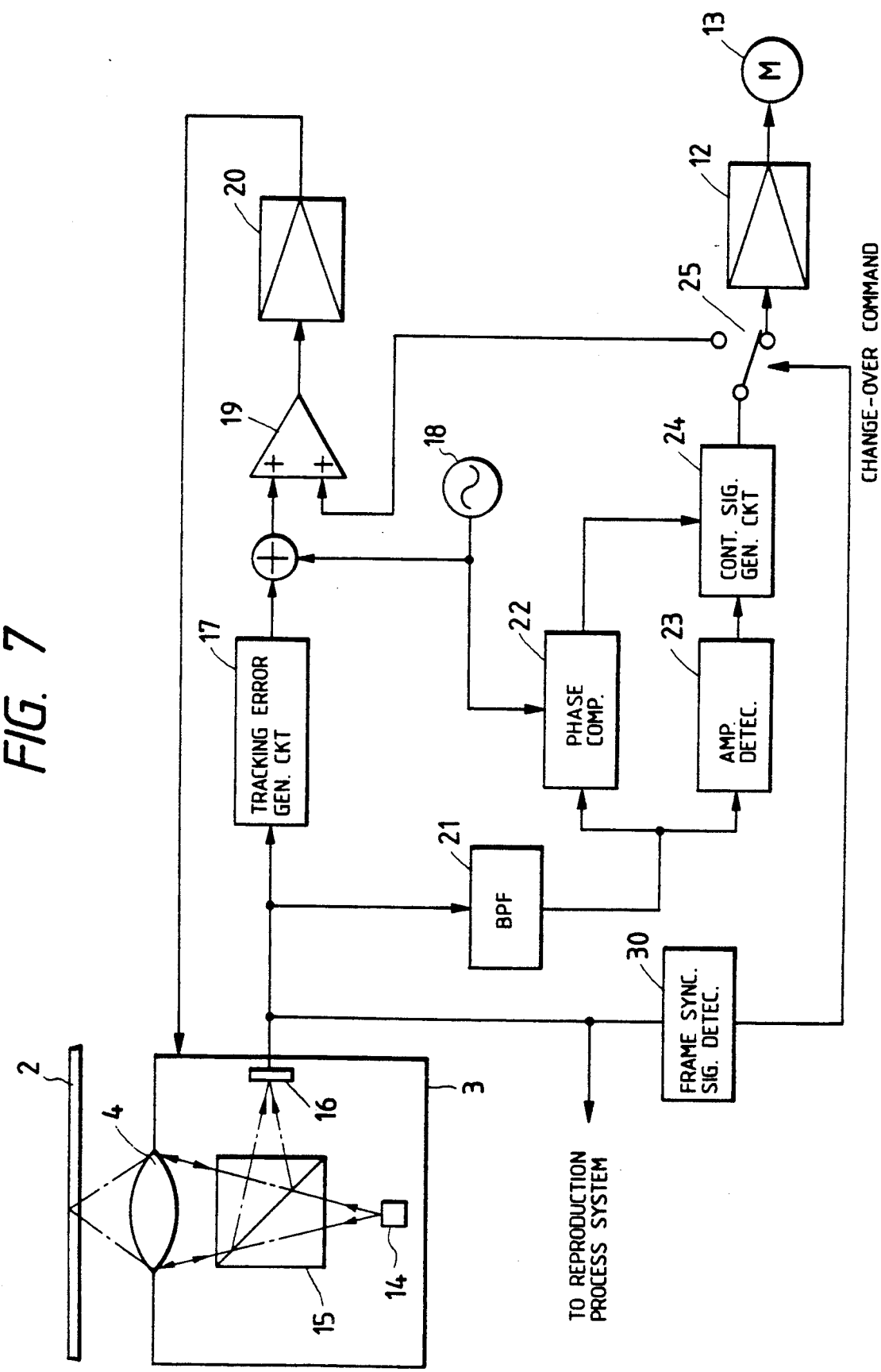
FIG. 7 is a block diagram illustrating a further embodiment of the present invention.

The control signal is used for the tilt adjustment (the tilting servo) of the optical axis when the control signal is used as the input of a driving amplifier 12 by switching a changeover switch 25, and it is used for the position adjustment of the beam spot when the control signal is used as the other input of the adder 19. For example, if recorded information is mainly analog information such as that on a video disk or the like, tilt adjustment of the optical axis is performed based on the above-mentioned control signal so that it is possible to reduce interference of a signal from an adjacent track (cross-talk) due to tilt of the optical axis. When recorded information is mainly digital information such as that in a digital audio disk or the like, the position adjustment of the beam spot is performed based on the above-mentioned control signal so that it is possible to prevent a signal from deteriorating due to slipping-off of the beam spot out of a track. The control of switching of the changeover switch 25 in this case is to be achieved by an automatic or manual operation. In order to achieve such a automatic operation, the diameter of a disc may be detected, or the presence of a frame synchronizing signal may be detected by a frame synchronizing signal detector 30 as shown in FIG. 7, to automatically switching the changeover switch 25.

Figure 4:
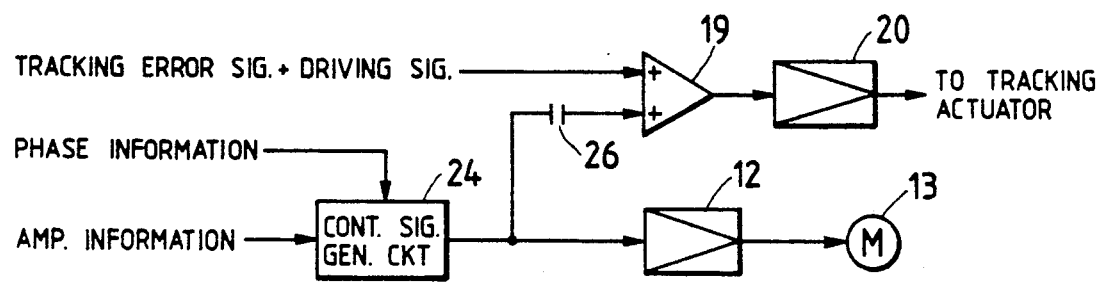
FIG. 4 is a block diagram illustrating another embodiment of the present invention.

Since the tilt adjustment of the optical axis is performed by changing the relative angle between the disk 2 and the pickup 3, generally the response speed is low. On the other hand, since the position adjustment of the beam spot is performed by changing the positions of the objective lens 4 and so on by the actuator, generally its response speed is high. Therefore, although the above embodiment is arranged to change over the tilt adjustment of the optical axis and the position adjustment of the beam spot by the changeover switch 25, an arrangement may be adopted in which correction for a relatively low frequency component (for example, $\leq 1$kHz) of the above-mentioned control signal is achieved by the tilt adjustment and correction for a relatively high frequency component (for example, $>1$kHz) is achieved by the position adjustment as shown in FIG. 4.

Although the beam spot is always oscillated to thereby perform the tilt adjustment of the optical axis or the position adjustment of the beam spot in the above-mentioned embodiment, the beam spot may be oscillated intermittently to perform the above-mentioned respective adjustments. Such intermittent oscillation is possible because disk warp increases in the direction of the outer circumference of the disk. Thus, the beam spot may be oscillated frequently (or continuously) at the disk outer circumference where tilt of the optical axis is remarkable, and intermittently at the disk innercircumference where there is little tilt. It is possible to judge the position of the disk inner/outer circumference based on position information provided by a potentiometer associated with a slider carrying the pickup 3, or address data such as a frame number, a chapter number or the like reproduced from the disk.

As described above, according to the present invention, by vibrating a beam spot while tracking a recording track, extracting a frequency component due to the oscillation of the beam spot from the output of a light detector, detecting the amplitude of the frequency component and its phase relative to a reference signal, and, correspondingly to a detection signal therefrom, adjusting the relative position of the beam spot relative to the recording track or adjusting the tilt of an optical axis of a light beam, it is possible to reduce signal deterioration due to an off-track condition, or crosstalk due to the tilt of the optical axis so that it is possible to obtain a good quality reading RF signal. Further, since there is no need for a tilt sensor which was used conventionally, it becomes possible to reduce a number of parts and unnecessary to provide space for them so as to be able to attain minimization in size as well as cost of the apparatus.

What is claimed is:

1. An optical information reading apparatus comprising:

an optical system for radiating a light beam in the form of a beam spot on an information recording surface of a disk-like recording medium;

a light detector for receiving said light beam from said information recording surface;

tracking error signal generating means for generating a tracking error signal corresponding to an amount of deviation of said beam spot from a recording track of said recording medium in accordance with an output of said light detector;

tracking servo means for controlling a relative position of said beam spot relative to said recording track in accordance with said tracking error signal to minimize said amount of deviation;

adjustment means for adjusting a tilt of an optical axis of the light beam relative to said information recording surface;

means for superimposing a driving signal of a predetermined frequency on said tracking error signal;

extraction means for extracting a signal components of said predetermined frequency from the output of said light detector and providing an output signal accordingly; and detection means for detecting an amplitude of said extraction means output signal, for detecting a phase of said extraction means output signal relative to said driving signal, and for providing an output signal accordingly, said adjustment means selectively adjusting said tilt of the optical axis in accordance with said detection means output signal.

2. An optical information reading apparatus as claimed in claim 1, further comprising means for forming a driving input signal from said tracking error signal and said detection means output signal, said formed driving input signal controlling said tracking servo means.

3. An optical information reading apparatus as claimed in claim 2, wherein said means for forming a driving input signal is an adder.

4. An optical information reading apparatus as claimed in claim 1, wherein said extraction means is a bandpass filter.

5. An optical information reading apparatus comprising:
- an optical system for radiating a light beam in the form of a beam spot on an information recording surface of a disk-like recording medium;
- a light detector for receiving said light beam from said information recording surface;
- tracking error signal generating means for generating a tracking error signal corresponding to an amount of deviation of said beam spot from a recording track of said recording medium in accordance with an output of said light detector;
- tracking servo means for controlling a relative position of said beam spot relative to said recording track in accordance with said tracking error signal to minimize said amount of deviation;
- adjustment means for adjusting a tilt of an optical axis of the light beam relative to said information recording surface;
- means for superimposing a driving signal of a predetermined frequency on said tracking error signal;
- extracting means for extracting a signal component of said predetermined frequency from the output of said light detector and providing an output signal accordingly; and
- detection means for detecting an amplitude of the extraction means output signal, for detecting a phase of said extraction means output signal accordingly; said tracking servo means selectively adjusting said relative position in accordance with said detection means output signal, and said adjustment means selectively adjusting said tilt of the optical axis in accordance with said detection means output signal.

6. An optical information reading apparatus as claimed in claim 5, wherein said extraction means is a bandpass filter.

7. An optical information reading apparatus as claimed in claim 5, further comprising means for forming a driving input signal from said tracking error signal and said detection means output signal, said formed driving input signal controlling said tracking servo means.

8. An optical information reading apparatus as claimed in claim 7, wherein said means for forming a driving input signal is an adder.

9. An optical information reading apparatus as claimed in claim 5, in which when said detection means output signal includes a relatively low frequency component, then said adjustment means adjusts said tilt of the optical axis, and when said detection means output signal includes a relatively high frequency component, then said tracking servo means adjusts said relative position.

10. An optical information reading apparatus as claimed in claim 9, further comprising:
- switch means for selectively supplying said detection means output signal to one of said tracking servo means and said tilt adjustment means.

11. An optical information reading apparatus as claimed in claim 10, in which if recorded information is analog information, then said switch means supplies said detection means output signal to said tilt adjustment means, and if the recorded information is digital information, then said switch means supplies said detection means output signal to said tracking servo means.

12. An optical information reading apparatus as claimed in claim 10, wherein said switch means is a changeover switch.

* * * * *